United States Patent Office 3,792,112
Patented Feb. 12, 1974

3,792,112
EPOXIDE-DIMETHYLOL PROPIONIC ACID REACTION PRODUCT WITH AMINE ALDEHYDE CONDENSATE
John Allister Gannon and Arthur Allen Tracton, Toms River, N.J., assignors to Ciba-Geigy Corporation, Ardsley, N.Y.
No Drawing. Continuation-in-part of abandoned application Ser. No. 789,948, Jan. 8, 1969, and a division of application Ser. No. 90,014, Nov. 16, 1970, now Patent No. 3,707,526. This application Oct. 16, 1972, Ser. No. 298,170
Int. Cl. C08g 45/10
U.S. Cl. 260—834
2 Claims

ABSTRACT OF THE DISCLOSURE

Coating systems applicable by conventional coating techniques as well as by electrophoretic coating are provided by reacting a hydroxycarboxylic acid such as dimethylolpropionic acid with an epoxy resin and optionally any of a dibasic acid and a diol in the absence of an externally added esterification catalyst and curing the thus obtained product. A variety of coating systems is obtained including water-soluble resins obtained by neutralizing with an amine the reaction product prior to curing.

CROSS-REFERENCE TO RELATED APPLICATIONS

This application is a continuation-in-part of application Ser. No. 789,948, filed Jan. 8, 1969 and now abandoned, and a divisional case of Ser. No. 90,014, filed Nov. 16, 1970, and now U.S. Pat. 3,707,526.

BACKGROUND OF THE INVENTION

In recent years there has been a marked trend toward the use of various resin materials as coatings including water-based coating systems based on, among other considerations, the elimination of the use of volatile solvents with their attendant hazards and recovery costs and on the fact that water is an inexpensive solvent.

In view of the excellent properties characterizing epoxy based coating compositions, considerable effort has been expended in the search for satisfactory epoxy coating systems using either water or non-volatile organic systems. None of the systems developed so far has been completely satisfactory and the achievement of an epoxy resin based system providing optimum properties is the object of continuing research efforts. The esterification reaction between certain hydroxy carboxylic acids and epoxy compounds is known in the art. In reacting such compounds together, two types of reactions may result owing to the chemical nature of the material used. Thus, the hydroxyl group of the hydroxy acid may react with the epoxide group to form ether linkages, or the carboxyl group of the acid may react with the epoxide to form ester groups. Both reactions may occur in an uncontrolled reaction to yield a product having mixed ether and ester linkages to a non-predetermined extent. Such circumstances with the epoxides and acids previously employed have not been tolerable since the ultimate product has not been suitable to any great extent for any practical purposes.

In an effort to overcome this, the art has attempted to optimize the esterification part of the reaction above referred to while minimizing the etherification part. This has been achieved by providing in the reaction medium an externally added esterification catalyst. Such materials are normally basic and are represented by tertiary amines, quaternary ammonium salts and the like. This situation has been especially true of attempts at reacting certain hydroxy tertiary carboxylic acids such as dimethylolpropionic acid (DMPA), for while other hydroxy acids have been reacted with epoxides in the absence of an esterification catalyst, the art has always regarded an esterification catalyst as necessary when using DMPA in reaction with an epoxide. Typical of this approach is that taken in U.S. Pat. No. 3,404,018.

SUMMARY OF THE INVENTION

In accordance with the present invention, it has now been discovered that dimethylolpropionic acid can be reacted with an epoxide resin in the absence of an externally added esterification catalyst, and optionally in the presence or absence of a dibasic acid or a diol, to produce curable resins having very desirable physical properties. The physical properties are especially manifested in film coatings obtained from the products of the invention after curing. Thus, the products can be directly cured as described below to yield coatings suitable for metal can liners, coil coatings, molding resins, adhesives, laminating resins and the like. Alternatively, the products can be treated with an amine, when an excess of acid has been used, to convert the resin to a water-soluble form with subsequent curing. Coatings, films and castings obtained from the products of the present invention are characterized by good adhesion, flexibility, color and resistance to impact, abrasion and attack by chemicals and alkali solutions.

DESCRIPTION OF THE PREFERRED EMBODIMENT

The epoxy compounds employed are those epoxy compounds having a weight per epoxide of from 180 to 530. Thus the epoxy compound can be either liquid or solid and can be employed either per se or in the form of blends.

As epoxide compounds there can be used esters such as are obtainable by the reaction of a di- or polybasic carboxylic acid with epichlorohydrin or dichlorohydrin in the presence of an alkali. Such esters may be derived from aliphatic dicarboxylic acids, such as oxalic acid, succinic acid, glutaric acid, adipic acid, pimelic acid, suberic acid, azelaic acid, sebacic acid, and especially aromatic dicarboxylic acids, such as phthalic acid, terephthalic acid, 2:6-naphthalene-dicarboxylic acid, diphenyl-or-tho:ortho-dicarboxyic acid, ethylene glycol bis-(para-carboxyphenyl)ether or the like. Others which may be used are diglycidyl esters which correspond to the average formula:

$$CH_2\underset{O}{\underset{\diagdown \diagup}{-}}CH-CH_2-(OOC-X-COO-CH_2-CHOH-CH_2)_z-OOC-$$

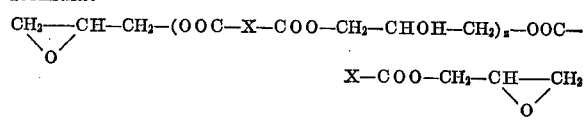

in which X represents an aromatic hydrocarbon radical, such as a phenyl group, and Z represents a small whole number or a small fractional number.

There may also be employed the polyglycidyl ethers such as are obtainable by the interaction of a dihydric or polyhydric alcohol or a diphenol or polyphenol with epichlorohydrin or related substances, for example, glycerol dichlorohydrin, under alkaline conditions or alternatively in the presence of an acidic catalyst with subsequent alkaline treatment. These compounds may be derived from glycols, such as ethylene glycol, diethylene glycol, triethylene glycol, propylene glycol-1:2, propylene glycol-1:3, butylene glycol-1:4, pentane-1:5-diol, hexane-1:6-diol, hexane-2:4:6-triol, glycerine and especially diphenols or polyphenols such as pyrocatechol, hydroquinone, 1:4-dioxynaphthalene, 1:5-dioxynaphthalene, phenol-formaldehyde condensation products, cresol-formaldehyde condensation products, bis-(4-hydroxyphenyl)-methane, bis-(4-hydroxyphenyl)-emthane phenylmethane bis-(4-hydroxyphenyl)-tolylmethane, 4:4'-dioxydiphenyl, bis-(4-hydroxyphenyl)sulphone and (for preference) 2:2-bis-(4-hydroxyphenyl)propane. There may also be employed diglycidyl ethers which correspond to the average formula:

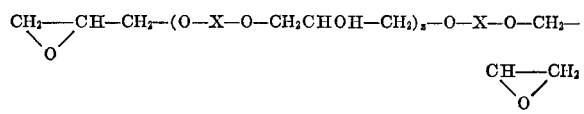

in which X represents an aromatic radical, and Z represents a small whole number or fractional number.

Especially suitable epoxide resins are those that are liquid at room temperature, for example, those obtained from 4:4' - dihydroxydiphenyl - dimethylmethane (Bisphenol A) which have an epoxide content of about 3.8 to 5.88 epoxide equivalents per kilogram. Such epoxide resins correspond for example, the average formula:

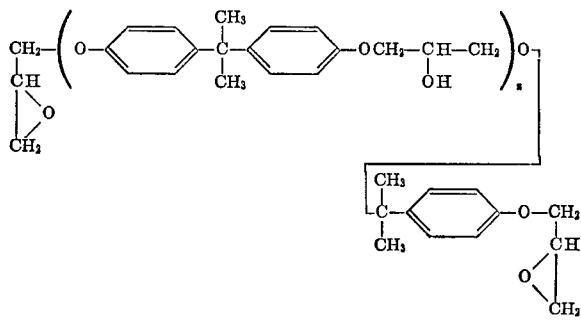

in which Z represents a small whole number or fractional number, for example, between 0 and 2.

There can also be employed cycloaliphatic polyepoxides such as are disclosed in U.S. Pat. Nos. 3,027,357, 3,072,678, 3,147,279 and 3,210,375.

In general, the dibasic acid component, when used can be any dibasic acid. Preferred use is made of the aliphatic dicarboxylic acids, such as azelaic acid, adipic acid, diglycolic acid and of the dimerized fatty acids such as the acid terminated dimer of linoleic acid. Acid terminated polyesters and polyethers may be employed as well.

In general, the diol component when used, can be any dihydric alcohol including hydroxy terminated polyethers and polyesters. Preferred use is made of the glycols such as tetramethyleneglycol, hexamethyleneglycol and pentamethyleneglycol. The optional use of these dibasic acids and diols is governed by the desirability of introducing different structural features into the final resin. This will be largely within the preferences of the individual fabricator.

The reaction between the epoxide and the dimethylolpropionic acid is carried out at elevated temperatures preferably at from about 135° C. to about 180° C. with a temperature of between 145° C. to 155° C. being preferred. While it is possible to work at temperatures above 180° C., the possibility of self-esterification occurring at such temperatures renders it generally undesirable to employ such temperatures. Similarly, while the temperature below 135° C. could be employed, the dimethylolpropionic acid is not sufficiently molten at such lower temperatures for satisfactory reaction. The reaction is normally complete in about 8 to 10 hours although shorter or longer times in the range of 5 to 15 hrs. produces suitable results.

The relative proportions of reactants utilized in carrying out the process of the invention, to a large extent, is dicated by the results desired in the final cured product. In general, the molar ratios of epoxide to dimethylolpropionic acid range from 1:3. to 1:0.3 and preferably 0.9:1 to 1.1:1 are employed. For such purposes a mole of epoxide is considered as containing 2 epoxy groups. For producing resins suitable for use as molding resins curable with conventional epoxy curing agents such as anhydrides and the like, a molar excess of the epoxide of the order of 2–3:1 is suitable. Epoxide: DMPA mole ratios of 1:2–3, i.e. excess acid, are normally employed where it is desired to produce water-soluble curable resins by neutralization as discussed below. Preferred, when can liner resins are ultimately desired, are mole ratios of from 0.9–1.1 most preferably unity.

As regards the third and fourth components, when employed, these are conveniently used at molar ratios ranging from .1 to 2 and preferably one mole per mole of DMPA used.

The above recited reactions may be carried out with or without solvent, but it is generally suitable to use no solvent. Under some circumstances, as when unconsumed epoxy groups are present, it is preferred to use a nonvolatile polar solvent as a reaction vehicle. Suitable solvents are cellosolve acetate, cyclohexanone, high boiling ethers and the like. The reaction can be run at solids levels of 50 to 95% and preferably 65 to 85% by weight of reaction product in the solvent system. Indeed these levels of final product in the solvent represent suitable materials for commercial use and sale.

The products of the invention are characterized by being curable in relatively short cure times when cured with conventional epoxy curing systems. Of particular suitability as curing agents are those containing a reactive hydrogen atom such as urea-formaldehyde, phenol-formaldehyde or melamine-formaldehyde condensation products. As stated above, the resins of the invention, when excess acid is employed, can be neutralized to render them water soluble. Neutralization of the reaction product is effected by an amine. In general, any amine, primary, secondary or tertiary, and aliphatic, aromatic or heterocyclic, as well as ammonia, can be employed. Preferred use is made of the alkanolamines, such as dimethylaminoethanol. Illustrative of the compounds which can be employed are ammonia, ethanolamine, triethanolamine, morpholine, diethylamine, 2-amino-2-methyl-1-propanol, 2 - amino - 2 - methyl-1,3-propanediol and tris(hydroxymethyl)-aminomethane.

The products of the invention, that is the reaction product of DMP with the epoxide and optional ingredients, produced as they are in the absence of any externally added esterification catalyst, differ from compounds of the art produced with a catalyst. That is, the instant compounds, rather than being almost completely made up of ester linkages, actually contain from 80 to 40 percent of ester groups and from 20 to 60 percent ether groupings. This relatively high percentage of ether linkages renders the product substantially different from those of the art and no doubt contributes to the desirable physical properties that the resins display upon subsequent curing.

The following examples serve to illustrate the invention.

EXAMPLE 1

112 grams of azelaic acid and 160 grams of dimethylol propionic acid are charged to a reaction vessel. The mixture is heated slowly to 150° C. under a nitrogen atmosphere. 370 grams of Araldite 6005, a liquid epoxy resin having an epoxy value of 0.54 eq./100 g., a specific gravity of 1.17 at 25° C. and a viscosity of 12–15,000 cps. at 25° C. on the Brookfield viscometer, prepared by reacting 4',4-dihydroxy diphenyl propane and epichlorohydrin in a molar ratio of 1 to about 10 are added to the reaction mixture over a period of 1 hour. The mixture is held at 150° C. for an additional period of 1 hour. The reaction mixture is then diluted with 150 parts of methyl Cellosolve. The reaction mixture is cooled to 95° C. and 76 grams of dimethyl amino ethanol are added slowly. The reaction temperature is controlled at from 95–100° C. and the reaction mixture stirred at 85–95° C. for a period of 30 minutes at the end of which period 150 parts of water are added. The reaction mixture is stirred for an additional 30 minutes at 85–95° C. and is then filtered under pressure at 85–95° C. to provide a product having a viscosity of 45,000–55,000 cps., a solids content of 60%, a flash-point of 175° F. and a color of 5 maximum and being dilutable with water.

The above procedure is repeated employing equivalent amounts of adipic acid, diglycolic acid, dimerized fatty acid (Empol 1016), 1,4-butanediol and 1,5-pentanediol, respectively, in place of the azelaic acid employed above and employing isopropanol in place of the methyl Cellosolve employed above.

Products having similar properties are obtained.

The above procedure is again repeated, employing 86 grams of triethylamine in place of the 76 grams of dimethylaminoethanol employed above. A product of similar properties is obtained.

EXAMPLE 2

370 grams of Araldite 6005, 22 grams of 1,4-butanediol and 47 grams of azelaic acid are charged to a reaction vessel. The mixture is heated to 150° C. under a nitrogen atmosphere with stirring and held at 150° C. for about 1 hour. 160 grams of dimethylol propionic acid are then charged to the reaction mixture which is held at 150° C. until an epoxy content of less than 0.1 eq./kg. is achieved. The batch is then diluted with 138 grams of methyl Cellosolve. The temperature of the reaction mixture is lowered to 95° C. and the reaction mixture neutralized by the addition of 76 grams dimethylaminoethanol. The neutralized reaction mixture is agitated at 85–95° C. for 30 minutes. 138 grams of water are added and the mixture stirred for a further period of 30 minutes at 85–95° C. followed by filtration under pressure. A product having similar properties to those of Example 1 is obtained.

EXAMPLE 3

The product of Example 1 is employed as a vehicle in an unpigmented system by admixing therewith as cross-linking agent 25 parts per hundred parts of resin of a melamine-formaldehyde condensation product, obtained by reacting 2.4 mols of formaldehyde with 0.3 mol of melamine in an aqueous medium at pH of 7.5 and at a temperature of 100° C., followed by filtration, washing with water and drying at 120–130° C.

The above composition comprising the resin and cross-linking agent is spread with a doctor blade on clean steel panels. The coated panels are then heated at 149° C. for 30 minutes. The film obtained was 0.7 mil thick, had good adhesion and flexibility, a reverse impact strength of 28 inch-pounds and satisfactory resistance to water, xylene and 5% caustic soda solution.

EXAMPLE 4

The product of Example 2 is employed as a vehicle in an unpigmented system by admixing therewith in two separate vessels 11 and 25 parts per hundred parts of resin respectively of a melamine-formaldehyde condensation product obtained according to the procedure described in Example 3.

The compositions are spread with a doctor blade on clean steel panels. The coated panels are then heated for 30 minutes at 177° C. with the results shown in the table below.

EXAMPLE 5

A representative composition for electrophoretic coating application is prepared by mixing the following components:

| | G. |
|---|---|
| Product of Example 1 | 133.3 |
| Cymel 300 (a melamine-formaldehyde condensation product) | 20.0 |
| Red iron oxide | 25.0 |
| Anionic emulsifier [1] (20% solids) | 10.0 |
| Butyl Cellosolve | 100.0 |
| Water | 981.7 |

[1] Triton X-301 a sodium alkyl aryl polyether sulfate.

The above composition is applied by electrodeposition to clean steel panels which have been phosphate primed.

The panels are plated employing a schedule comprising 10 v. DC for 120 seconds, followed by washing with demineralized water, blowing air across the surface of the panel and then curing for 30 minutes at 177° C.

The coated panels were characterized by good adhesion, flexibility, and impact strength and satisfactory resistance to water and xylene.

While use has been made above of melamine-formaldehyde condensation products as the water-soluble hardeners, it is to be recognized that amino-aldehyde condensation products generally can be employed.

EXAMPLE 6

A three-neck, round-bottom flask equipped with reflux condenser, stirred, thermometer and heating mantle is charged with 1 mole (380 g.) of CIBA Araldite 6010, a liquid epoxy resin made from Bisphenol A and epichlorohydrin having an epoxy value of 0.51–0.55 eq./100 grams, a specific gravity at 25° C. of 1.164 and a viscosity of 12,000–16,000 cps. at 25° C. on the Brookfield viscometer, 1 mole (134 g.) of dimethylolpropionic acid and a quantity (130 g.) of Cellosolve acetate solvent sufficient to provide an 80% solids solution. The reaction mixture is heated at 150° C. for 9 hours, at which time analysis shows an acid number of 3.5 and an epoxy content of 0.33 eq./kg. The reaction mixture is diluted to 50% with methyl Cellosolve and xylene so as to maintain a 1:1:1 by weight overall solvent mixture including the Cellosolve acetate initially charged. The reaction product contains approximately 50% of ether groups and 50% of ester groups.

The resin solution is next blended with a 60% solids solution of a urea-formaldehyde resin (Reichhold P–196–60) in the proportion of 80 parts of the former to 20 parts of the latter, and the resultant coating solution is employed to prepare coatings on aluminum panels. These coatings are resistant to solvents and acid after oven bakings three minutes at 350° F.

EXAMPLE 7

A three-neck, round-bottom flask equipped with a reflux condenser, stirrer, thermometer and heating mantle is charged with 2.2 moles (595 g.) of 3,4-epoxy cyclohexylmethyl - 3',4' - epoxy cyclohexane carboxylate (CY-179) having the following properties:

Viscosity, 350 cps. at 25° C.
Weight per epoxide, 140 gm.

and heated to 150° C. One mole (134 g.) of dimethylolpropionic acid is then added to the CY-179 in equal increments over a period of 1 hour.

The reaction mixture is then held at 150° C. for an additional hour, whereupon analysis shows an acid number equal to zero. The reaction mixture is discharged as 100% solids to provide a solid resin upon cooling and

| Hardener concentration | Adhesion | Flexibility | Reverse impact | Resistance water | Xylene | 5% NaOH |
|---|---|---|---|---|---|---|
| 11.1 phr | Excellent | Good | 128 in.-lb | Satisfactory | Satisfactory | Satisfactory. |
| 25.0 phr | Fair | Fair | 4 in.-lb | do | do | Do. | possessing a Durran's softening point of 86° C. and an epoxy content of 2.48 eq./kg. The reaction product contains about 50% ether and about 50% ester groups.

EXAMPLE 8

A three-neck, round-bottom flask equipped with a reflux condenser, stirrer, thermometer and heating mantle is charged with 1 mole (439 g.) of bis(3,4-epoxy-6 methyl cyclohexylmethyl) adipate (CY–178) having the following properties:

Viscosity, 900 cps. at 25° C.
Weight per epoxide of 213 gms.

and heated to 150° C. One mole (134 g.) of dimethylolpropionic acid is added to the CY–178 in equal increments over a 1-hour period.

The reaction mixture is then heated at 150° C. for an additional hour, whereupon analysis shows an acid number equal to 13, together with an epoxy content of 0.43 eq./kg. The product has 60% ether groups and 40% ester groups. The resin is then diluted to 60% solids content with methyl Cellosolve to provide a coating vehicle. Admixture of the vehicle with a urea-formaldehyde resin in the proportion of 80 parts to 20 parts of the latter provides a coating solution which is used to prepare coatings on aluminum panels. These coatings are resistant to solvents such as xylene, methyl isobutyl ketone and acetone after baking for 3 minutes at 350° F.

EXAMPLE 9

A three-neck, round-bottom flask equipped with reflux condenser, stirrer, thermometer and heating mantle is charged with 2 moles (760 g.) of CIBA Araldite 6010, 0.5 mole (282 g.) of Empol 1014 dimer acid, which is essentially dimerized linoleic acid and 0.5 mole (67 g.) of dimethylolpropionic acid.

The mixture is then heated to 170° C. with agitation and held at that temperature until an acid number of 1.0 is reached (approximately 5 hours). The reaction mixture is then diluted to 60% solids with a 1:1 mixture by weight of Cellosolve acetate/xylene. Blending of the resin solution with a urea-formaldehyde resin in the ratio of 80 parts to 20 parts by weight yields cured films after baking 3 minutes at 350° F.

EXAMPLE 10

A four-neck, round-bottom flask equipped with mechanical agitation, reflux condenser, thermometer and dropping funnel is charged with 2 moles (268 g.) of dimethylolpropionic acid and heated to 150–155° C. under nitrogen. 1 mole (380 g.) of CIBA Araldite 6005 is slowly added via a dropping funnel to the molten acid over a period of 1 hour maintaining the reaction temperature. At the conclusion of the feed the reaction mixture is held for an additional 30 minutes whereupon the epoxide content is 0 and the acid number is equal to 100. The reaction temperature is then lowered to around 130° C. and the product is diluted with butyl Cellosolve to 60% non-volatiles and pressure filtered. The batch is cooled to 25–35° C. and 100% neutralized with dimethylaminoethanol based on the acid number obtained.

What is claimed is:

1. A process which comprises neutralizing with an amine the product obtained by the process of reacting at elevated temperatures dimethylolpropionic acid and a 1,2-epoxy compound having a weight per opoxide of from about 180 to about 530 in a molar ratio of epoxide to dimethylolpropionic acid of 1:3 to 1:03 and in the presence of a dibasic acid selected from the group consisting of aliphatic dicarboxylic acid and dimerized fatty acid, or mixtures thereof in the absence of an externally added esterification catalyst; and when unconsumed epoxide is present, using a non-volatile polar solvent as a reaction vehicle; and further combining said amine neutralized reaction product with a water-soluble amino aldheyde condensation product curing agent.

2. The process of claim 1 wherein the condensation product is a melamine-formaldehyde condensation product.

References Cited

UNITED STATES PATENTS 3,404,018  10/1968  Hicks _____ 260—75 EP
3,464,939  10/1969  Westrenen _____ 260—18 EP PAUL LIEBERMAN, Primary Examiner U.S. Cl. X.R.

117—127, 128.4, 161 ZB; 260—2 EP, 2 EA, 18 EP, 29.2 EP, 31.4 EP, 32.8 EP, 33.2 EP, 33.6 EP, 37 EP, 47 EA, 47 EP, 59, 78.3 R, 78.4 EP, 823, 831, 835, 860